Nov. 4, 1930. V. J. BURNELLI 1,780,811
RETRACTABLE LANDING GEAR
Filed Dec. 31, 1928 3 Sheets-Sheet 3
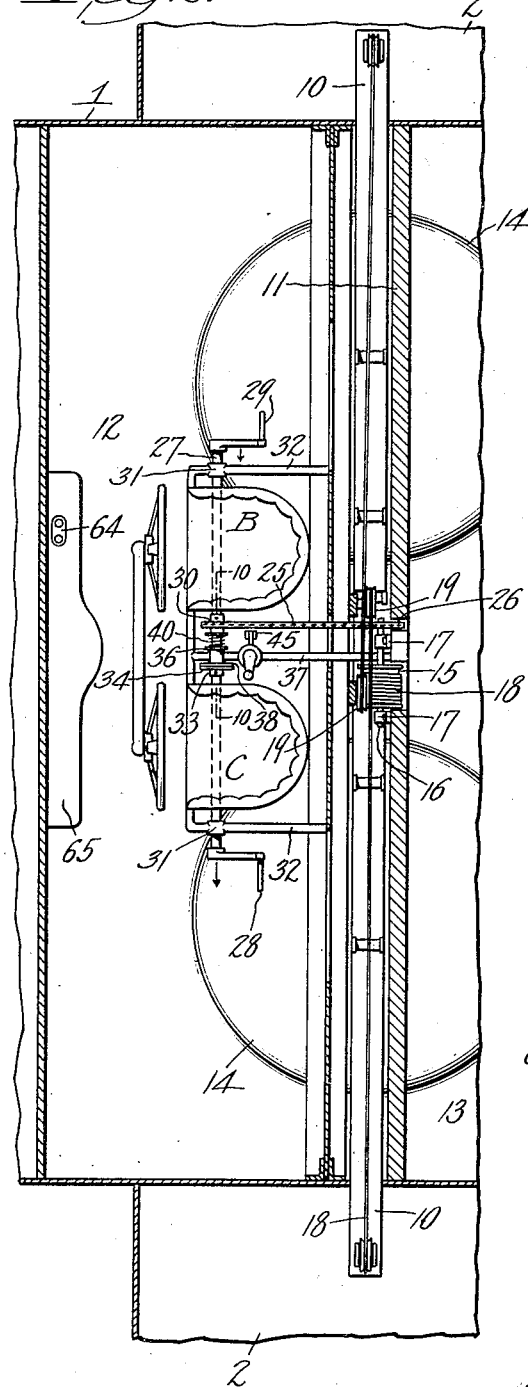
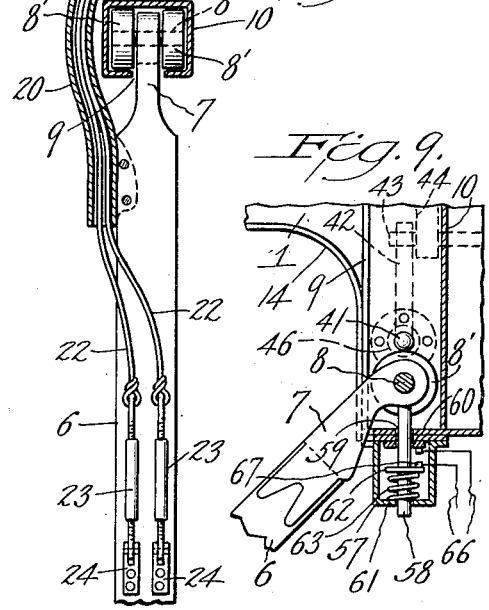
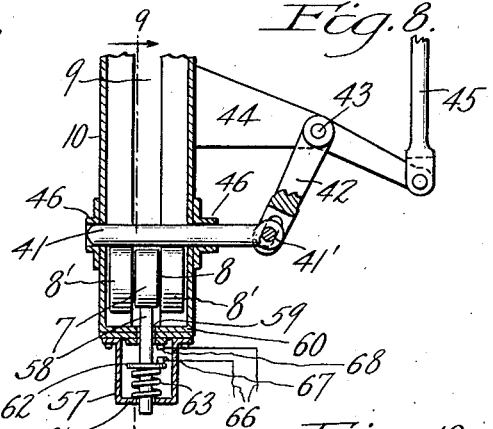
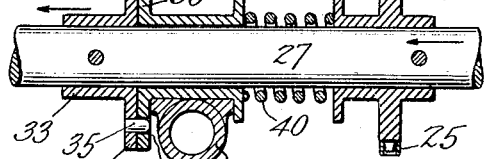

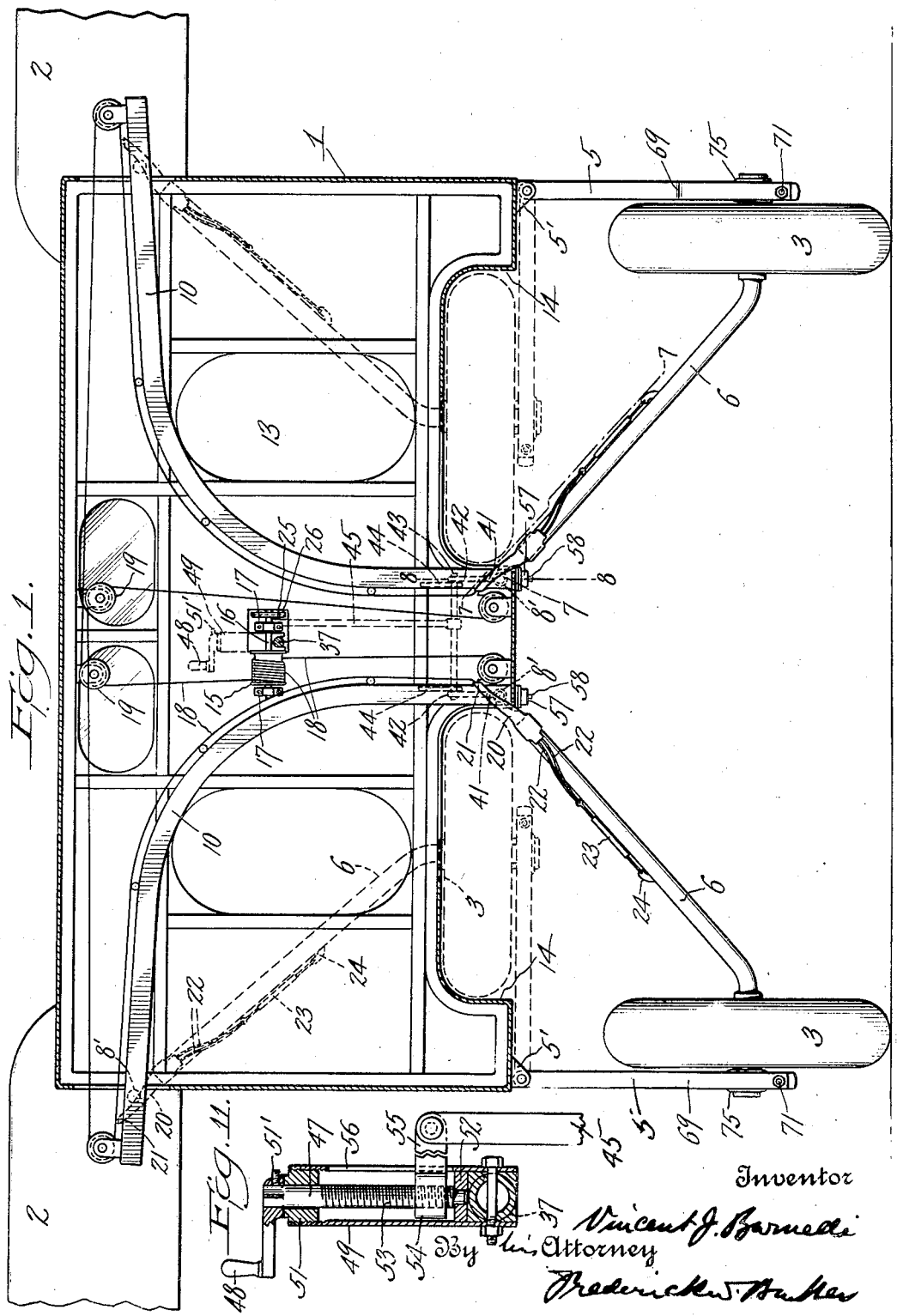

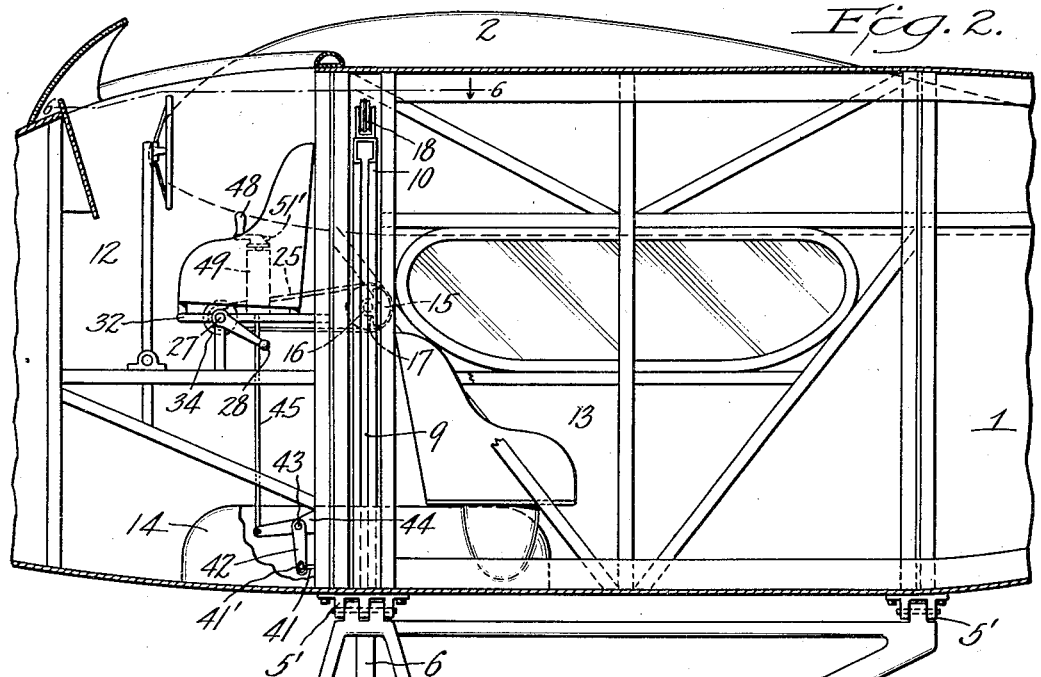
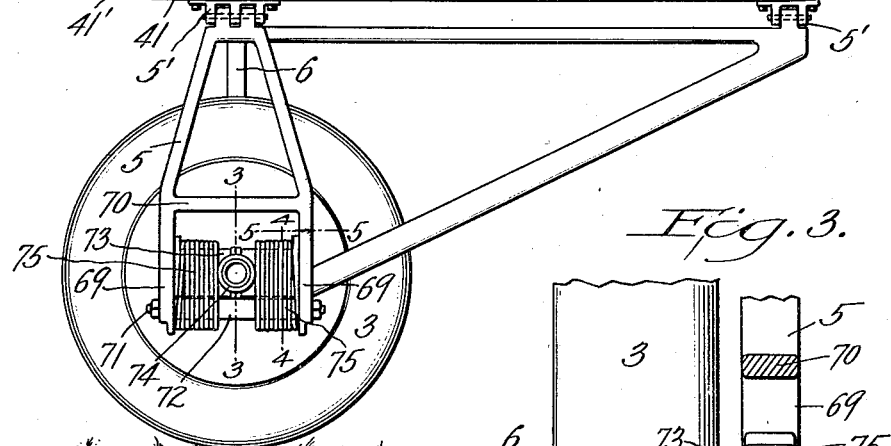
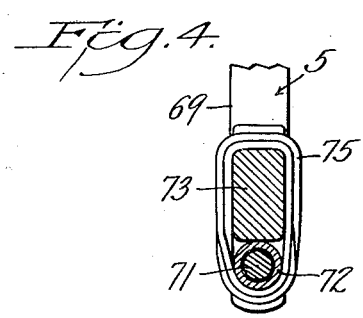
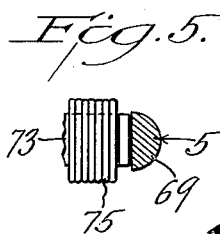
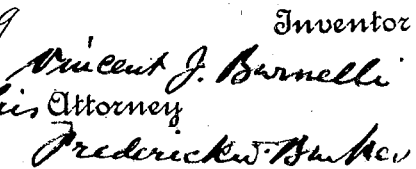

Patented Nov. 4, 1930

1,780,811

UNITED STATES PATENT OFFICE

VINCENT J. BURNELLI, OF NEW YORK, N. Y., ASSIGNOR, BY DIRECT AND MESNE ASSIGNMENTS, TO THE UPPERCU-BURNELLI CORPORATION, A CORPORATION OF DELAWARE

RETRACTABLE LANDING GEAR

Application filed December 31, 1928. Serial No. 329,441.

This invention relates to retractable landing gear for airplanes having novel operating means and my improvements are inclusive of certain essential features which may be briefly summarized as follows:—

(1) Wheels that are carried by struts or brackets hinged to and pendent from the bottom of a wide fuselage, such for example as that employed in the Burnelli type of airplane, wherein the fuselage is of airfoil contour, are adapted to fold inwardly and upwardly into horizontal positions within recesses provided therefor in the fuselage bottom, the wheel axles being provided with extensions that engage and travel within arcuate channels presenting an upwardly transverse path in symmetrical relation with the arc described by the wheel struts in their movement.

(2) A cable, attached to the free ends of the axle extensions, is passed over guide rollers and wrapped upon a pivotal drum that is rotatable in opposite directions whereby the cable is caused to respectively retract and lower the landing gear.

(3) Located below the pilots' seats in a dual control machine is a shaft that is suitably journalled and provided with locking means to prevent rotation of the shaft and thus to hold the landing gear in any desired position.

(4) Also, for the purpose of positively preventing retraction of the landing gear when the wheels are required to be in service I employ stout bars adapted to enter and lie transversely across the arcuate channels, near their lower ends, just above the axle extensions when the latter are in their lowered positions, the bars being operated by means of bell-cranks that are actuable through a link which is under the control of a vertical shaft, said shaft being provided with a manipulable handle located near the pilot's seat.

(5) Further my invention includes the provision of novel structure in replaceable shock absorbing means whereby the hinged struts are connected in highly efficient cushioned relation with the wheel axles.

(6) Still further my invention contemplates the employment of visual signalling means, located on the dash-board and electrically operated to show when the landing gear is positively extended for service, this signalling means being actuated by contacts that are automatically controlled in the operation of the landing gear.

Other features and advantages of my invention will hereinafter appear.

In the drawings:—

Figure 1 is a transverse sectional view of an airplane embodying my improvements.

Fig. 2 is a partial longitudinal section thereof.

Fig. 3 is a detail in section of the shock absorbing means employed, taken on the line 3—3 of Fig. 2.

Fig. 4 is a section on the line 4—4 of Fig. 2.

Fig. 5 is a section on the line 5—5 of Fig. 2.

Fig. 6 is a horizontal sectional view taken on the line 6—6 of Fig. 1.

Fig. 7 is a section on the line 7—7 of Fig. 1.

Fig. 8 is a detail view on section, taken on the line 8—8 of Fig. 1.

Fig. 9 is a section on the line 9—9 of Fig. 8.

Fig. 10 is a section on the line 10—10 of Fig. 6, and

Fig. 11 is an enlarged detail view, in section, of the operating means for the locking pins.

In said views let 1 indicate the fuselage of a Burnelli type airplane having the supporting air-foils 2, 2 extended therefrom and provided with the traction wheels 3, 3 which are here shown as carried by brackets 5, 5 that respectively are hinged to lugs 5' at the fuselage bottom, the wheels being journalled at the inner sides of said brackets to thus depend, in service, below the fuselage and within the vertical planes of its sides.

The wheel axles 6, 6 are each angled upwardly and inwardly from the service position of the wheels, and are provided with goose-neck extensions 7 (see Fig. 9) each having a stub shaft 8 therethrough that carries wheels 8', 8' at opposite sides of the extension.

Each extension 7 is entered through a slot 9 in an arcuate channel 10 that extends upwardly from near the bottom of the fuselage 1C.

and transversely outward through the wall thereof.

The respective channels 10, while relatively near together at their lower ends, are curved in opposite directions that they may extend through opposite walls of the fuselage. Said channels are here shown as secured to the forward bulkhead 11, which, in the Burnelli type of machine illustrated, separates the pilot's cabin 12 from the passenger or useful load compartment 13.

The wheels 8', 8' on the respective extensions 7 are intended to travel in the respective channels 10 during retraction and return of the wheels 3, said wheels, when retracted becoming lodged respectively in the recesses 14, 14 provided for their reception in the bottom of the fuselage, in which recesses said wheels lie horizontally, with their outer surfaces flush with the fuselage bottom.

As means for moving the traction wheels between their surface and retracted positions, I provide a drum 15 which is mounted on a shaft 16, journalled in bearings 17 secured to bulkhead 11, said drum having a cable 18 wrapped thereon and extended over fixed pulleys 19 into engagement with the wheel axles 6, 6, to simultaneously operate said axles and the wheels.

The means of connection between cable 18 and axles 6 is more clearly shown in Fig. 7, wherein a hollow guide member 20 appears secured to an axle, near its extension 7, said member 20 being curved to pass around a channel 10, and having its exit flared, as at 21. The cable is doubled to enter and pass through guide 20, and is divided to provide the separate ends 22, 22, each end connecting with an individual turn-buckle 23, both turn-buckles having connection with the axle, as at 24. It is by means of these turnbuckles that the respective portions of the cable may be effectively tautened, as, there being four different ends to the cable, each with its own turn-buckle, the slack therein can be taken up at four different points.

The drum is operated by means of a sprocket chain 25, that passes over a sprocket wheel 26 carried by the drum shaft 16, said chain being driven by a shaft 27, having crank handles 28, 29, and carrying a sprocket 30 (here shown smaller than sprocket 26) that engages said chain. The drum shaft 27 is slidably shiftable in its bearings 31, 31, which latter are here shown as carried by the frame members 32, means being provided for normally holding said shaft against rotation when shifted in one direction, and for releasing it when shifted in the opposite direction so that it may be free to rotate and thus to operate the drum.

In Fig. 10 it will be clearly seen that shaft 27, which carries the sprocket 30, also carries a sleeve 33 which is provided with a radial flange 34, studs 35 projecting from the face of said flange; also that shaft 27 is free to slide within a fixed sleeve 36, here shown as secured to a frame member 37. Said sleeve 36 is provided at one end with a radial flange 38, opposed to the flange 34, which flange 38 is provided with the holes 39, in registry with and adapted to receive the studs 35 when the flanges 34, 38 are urged together by the coiled spring 40 that is placed about shaft 27, between the sprocket wheel 30 and sleeve 36. In order to render shaft 27 operable for actuation of drum 15, said shaft is to be shifted longitudinally, in the direction of the arrow (see Fig. 10), thereby compressing spring 40 and causing the studs 35 of flange 34 to withdraw from their engagement in the holes 39 in flange 38. This shifting operation is performed by a pilot preparatory to turning a crank handle at the side of his seat. For example, the pilot occupying seat B, grasping handle 29, would draw that handle toward him to release shaft 27, while a pilot occupying seat C, grasping handle 28, would extend that handle for the same purpose. Upon release of either handle the spring 40 will automatically cause the reengagement of studs 35 in holes 39 and thus lock flanges 34, 38 together, thereby, through the medium of drum 15 and cable 18 holding the wheels 3 in their fully retracted position, as shown in dotted lines in Fig. 1, or in any other elevated position.

When the wheels have been extended for landing and traction purposes it is of the greatest importance that they be securely held and locked in that position, to avoid any liability of retraction while the wheels are in use. Therefore I provide locking means most clearly shown in the detail view of Fig. 8, wherein there appears a stout bar 41, having pin and slot connection at 41' with one arm of a bell-crank 42, that is pivoted at 43 to a bracket 44 extended from the channel 10, and pivotally engaged at its other arm by a link 45, which latter is capable of vertical movement.

The bar 41 is movable by bell crank 42 through bearings 46 secured at opposite sides of channel 10 whereby in the inward movement of said bar it is caused to extend transversely across the interior of said channel, and in its outward movement said bar is withdrawn until its free end lies outside the channel but supported in the adjacent bearing 46, in readiness for reinsertion.

As inserted the bar 41 lies above wheels 8', 8' that are carried by the goose-neck portion 7 of the axle, when the latter and its wheel 3 are fully extended for service, thereby locking said axle against any retractile movement and enabling the traction wheels to positively perform their functions.

It will be appreciated that similar locking mechanisms are employed for each of the axles 6, the shaft 43 being common to both mechanisms, and each channel 10 having a bracket 44 for said shaft.

In Fig. 11 I have shown an enlarged detail view of the control means for the aforesaid locking mechanisms, said control means comprising a vertical shaft 47 having a crank handle 48, said shaft being contained in a cylindrical casing 49 that is mounted on and secured to a frame member 50, the location whereof is between the pilots' seats B, C, so that the handle can be manipulated conveniently by either pilot. The shaft 47 is pivoted in an upper bearing 51 and a lower bearing 52 and the crank handle is held thereon by a set screw 51'. Said shaft is provided with a screw thread 53 for a portion of its length intermediate said bearings. Engaged with thread 53 is a boss 54, having an extension 55 which projects beyond casing 49 through a vertical slot 56 in the latter, said extension 55 being in pivotal engagement with the upper end of link 45.

From the forgoing description of the control means it will be apparent that by rotating the shaft 47, the boss 54, and consequently the link 45 will be moved vertically, either up or down, according to the direction of rotation imparted through crank handle 48, for the operation of locking bar 41.

The lower end of each channel 10 has attached thereto a casing 57 in which is placed a plunger 58 that projects vertically through an orifice 59 provided therefor in the channel base 60, the lower end of said plunger extending through a guide orifice in the base 61 of casing 57. Said plunger carries a collar 67, and a coiled spring 63 lies between said collar and base 61. The plunger projects into the path of goose-neck 7 and by reason of spring 63 affords a cushion to absorb the shock of impact as the axle and wheel are extended into service position, prior to operation of the locking device.

My invention still further includes means for affording information to the pilots as to the retracted and extended positions of the landing gear, it being of especial importance that the pilots have certain knowledge of the fully extended position of said landing gear before the locking bar 41 is inserted by the operation of crank handle 48.

Therefore a signal lamp 64, electrically energizable is located in a suitable position, as upon the dashboard 65, the circuit wires 66 thereof extending to contact terminals 67, 68, located respectively upon the collar 62 and the base 60 of channel 10, in opposed relation. Normally, with plunger 58 extended under the expansion of spring 63 these contacts are engaged, to close the circuit (whose source of energy is not indicated in the drawing), and therefore the signal lamp will be energized while the landing gear is in a retracted position. But when the landing gear is fully extended, in position for the application of locking bar 41, the plunger 58 at that time being depressed (see Fig. 9), then the contacts 67, 68 are separated and the circuit is broken, thereby extinguishing the lamp, and thus affording the desired information.

Special shock absorbing means have been devised by me for use in connection with the landing gear herein described, characterized by the facility with which renewals can be effected of the cushioning elements, and by the general efficiency of the device.

For these purposes the brackets 5 each has a pair of depending parallel arms 69, in spaced relation. Said arms 69 are braced by an integral transverse member 70 which occurs at an upper position, and a bolt 71, engaging the lower ends of said arms, extends transversely between them in spaced parallelism with member 70. The bolt 71 is ensheathed by a tube 72 that extends thereon between the arms 69. Placed upon the tube 72 is a block 73 of suitable material, said block being pierced to provide a bearing 74 for the wheel axle 6. The tube 72 and block 73 are united by being wrapped with stout elastic material 74 of sufficient strength to support the load, but which is yieldable under landing and other shocks, permitting the frame members 71, 72 to separate from block 73, thereby preventing breakage of parts and the imposition of undue strains upon the airplane structure.

Variations within the spirit and scope of my invention are equally comprehended by the foregoing disclosure.

I claim:—

1. The combination with an airplane having a fuselage of unusual width of retractable landing gear comprising pendent brackets hinged to the fuselage, axles mounted in said brackets, wheels journalled on said axles, said axles being angled upwardly toward the fuselage bottom in converging relation with the wheels extended, said fuselage bottom provided with recesses adapted to receive said wheels, laterally extending, slotted arcuate channels secured within said fuselage, goose-neck axle extensions respectively engaging said channels through their slots, and means connected with said axles respectively to simultaneously move said extensions along said channels, thereby causing said axles and wheels to travel between their extended and retracted positions.

2. The combination with an airplane having a fuselage of unusual width of retractable landing gear comprising pendent brackets hinged to the fuselage, axles mounted in said brackets, wheels journalled on said axles, said axles being angled upwardly toward the fuselage bottom in converging relation with the wheels extended, said fuselage bottom provided with recesses adapted to receive said wheels, laterally extending, slotted arcuate channels secured within said fuselage, goose-neck axle extensions respectively engaging said channels through their slots, a drum journalled in fixed bearings, means for rotating said drum, a cable wrapped on said drum and fixed pulleys to guide said cable, said cable engaging said axles respectively to simultaneously move said extensions along said channels, thereby causing said axles and wheels to travel between their extended and retracted positions.

3. The combination with an airplane having a fuselage of unusual width of retractable landing gear comprising pendent brackets hinged to the fuselage, axles mounted in said brackets, wheels journalled on said axles, said axles being angled upwardly toward the fuselage bottom in converging relation with the wheels extended, said fuselage bottom provided with recesses to receive said wheels, laterally extending, slotted arcuate channels secured within said fuselage, goose-neck axle extensions respectively engaging said channels through their slots, a drum journalled in fixed bearings, a shaft parallel with the axis of said drum, driving means between said shaft and drum, releasable locking means to prevent rotation of said shaft and drum, a cable wrapped on said drum and fixed pulleys to guide said cable, said cable engaging said axles respectively to simultaneously move said extensions along said channels, thereby causing said axles and wheels to travel between their extended and retracted positions.

4. The combination with an airplane having a fuselage of unusual width of retractable landing gear comprising pendent brackets hinged to the fuselage, axles mounted in said brackets, wheels journalled on said axles, said axles being angled upwardly toward the fuselage bottom in converging relation with the wheels extended, said fuselage bottom provided with recesses adapted to receive said wheels, laterally extending, slotted arcuate channels secured within said fuselage, goose-neck axle extensions respectively engaging said channels through their slots, and means connected with said axles respectively to simultaneously move said extensions along said channels, thereby causing said axles and wheels to travel between their extended and retracted positions, said channels provided with transversely aligned apertures near their lower ends, bars engageable in said apertures, above the axle extensions when the landing gear is extended, to lock it against retraction, and means controllable by a pilot to actuate said bars.

5. The combination with an airplane having a fuselage of unusual width of retractable landing gear comprising pendent brackets hinged to the fuselage, axles mounted in said brackets, wheels journalled on said axles, said axles being angled upwardly toward the fuselage bottom in converging relation with the wheels extended, said fuselage bottom provided with recesses adapted to receive said wheels, and means for retracting said axles and wheels for the lodgement of said wheels in said recesses, an electrically operated signal means having a circuit that is closed while the landing gear is retracted, causing the signal means to be energized, and means actuable by said landing gear in attaining its extended position for service to open said circuit and thereby de-energize said signal means.

Executed this 27th day of December, 1928.

VINCENT J. BURNELLI.